(No Model.)

O. TYBERG.
REVERSIBLE CHUCK.

No. 539,748. Patented May 21, 1895.

WITNESSES:
Wm Kiel Jr.
Edward F. Bates.

INVENTOR
Oluf Tyberg
BY Edward P. Wood
ATTORNEY.

UNITED STATES PATENT OFFICE.

OLUF TYBERG, OF BROOKLYN, ASSIGNOR TO THE GARVIN MACHINE COMPANY, OF NEW YORK, N. Y.

REVERSIBLE CHUCK.

SPECIFICATION forming part of Letters Patent No. 539,748, dated May 21, 1895.

Application filed July 11, 1894. Serial No. 517,215. (No model.)

*To all whom it may concern:*

Be it known that I, OLUF TYBERG, a subject of the King of Denmark, and a resident of the city of Brooklyn, in the county of Kings and State of New York, have invented certain new and useful Improvements in Reversible Chucks; and I hereby declare the following to be a full, clear, and exact description of my invention, such as will enable others skilled in the art to which it appertains to make and use the same, reference being had to the accompanying drawings, which form a part of this application.

The object of this invention is the production of a chuck which may be so reversed in position that opposite ends or sides of the work in the jaws may be operated upon alternately without resetting the jaws or removing the work from the chuck.

The several parts are marked by corresponding reference-letters in all the views.

Figure 1:
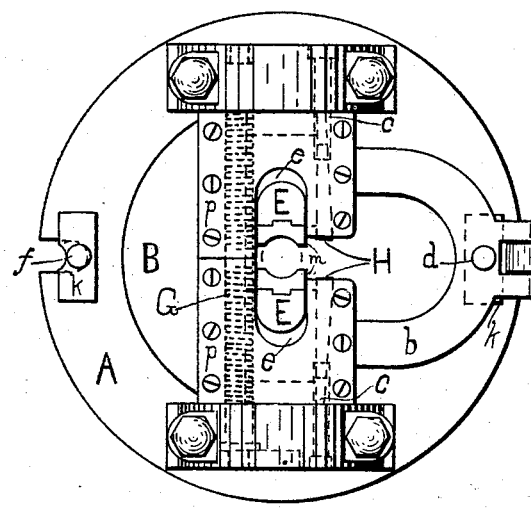
Figure 2:
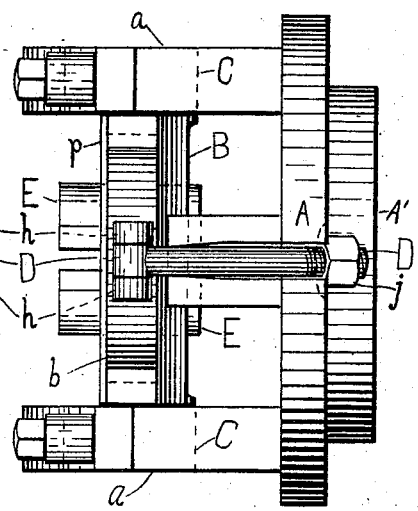
Figure 3:
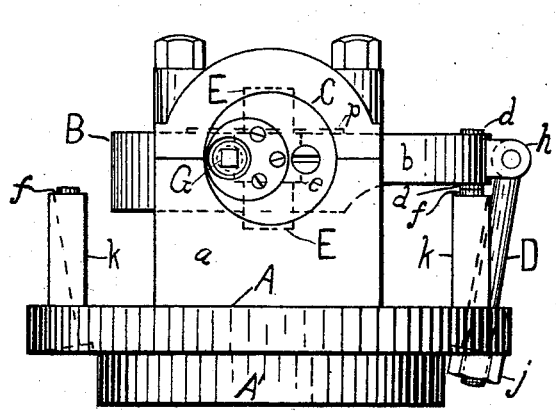
Figure 4:
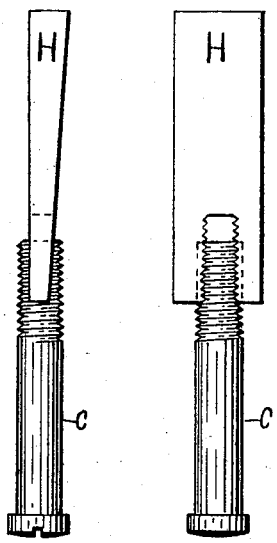
Figure 5:
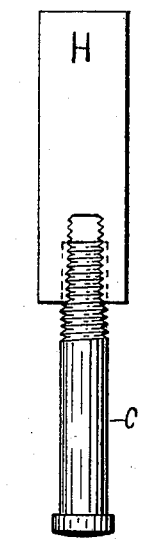
Figure 6:
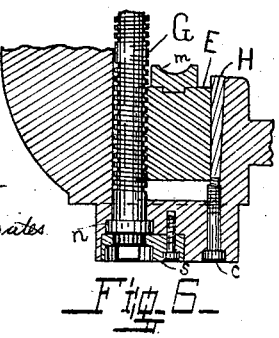

In the drawings, Figure 1 is a face view of the entire device. Fig. 2 is a side view showing the clamping-bolt in position for operating upon work in the jaws of the chuck. Fig. 3 is a view of another side, showing a trunnion, the right-and-left screw actuating the jaws of the chuck, one of the screws which regulate the wedge-gibs, the clamping-bolt, and the position of the jaws in the head, all of which will be fully described. Fig. 4 is an edge view of one of the gibs, showing the operating screw in position. Fig. 5 is a side view of Fig. 4. Fig. 6 is a section through one of the trunnions, parallel to its axis, showing the means employed to prevent longitudinal movement of the right-and-left screw and of the chuck-jaws.

The body upon which the reversible chuck-head is mounted consists of the base A made to fit onto a face-plate on a lathe or screw-machine in the ordinary manner, and having two lugs $a$ on which are journal-boxes adapted to receive the trunnions of the head B, at the sides thereof.

The head B constitutes the body of the chuck, and, being mounted on the trunnions C, is thereby allowed to be readily turned in the bearings so as to present its opposite sides alternately outward.

On one side of the head B and preferably integral with it, is the circular projection or arm $b$, which balances and strengthens the chuck-head, and has an opening through it, the purpose and effect of which will be hereinafter described. On the arm $b$ are lugs $h$, on which is reversibly pivoted the clamping-bolt D, which is shown as in position for clamping in Figs. 2 and 3, and which, when the nut $j$ is screwed firmly in place against the under side of the base A, holds the arm and head of the chuck rigidly in position against one of the lugs $k$. The surface against which the nut $j$ is screwed to tighten the clamping-bolt is preferably formed at such an angle to the under side of the base A that the nut, when tightened on the bolt, will lie nearer the center of the face-plate than the pivotal bearing of the clamping-bolt in the lugs $h$, inclining the bolt inwardly and bringing the clamping strain immediately under a lug $k$, and thus insuring the firm and steady position of the head, and avoiding in a measure the danger of the accidental loosening or slipping of the clamping-bolt by centrifugal force. Obviously, when the chuck is turned to present either face, it may be held firmly and rigidly parallel to the face-plate A', and with the jaws at right-angles thereto, when the clamping-bolt D is in position, by one of the hardened steel bearing-points $d$ on the arm and one of the hardened steel bearing-points $f$ on one of the lugs $k$ being clamped rigidly in contact. The lugs $a$ and $k$ are set quartering on the base-plate and the lugs $k$ are of such height as will cause the chuck-head to be stopped, in turning, at exactly a half-turn, by the bearing-points $d$ and $f$.

The jaws E of the chuck, furnished with hardened steel faces $m$, have rearwardly extending rectangular portions $e$ which slide in correlative seats in the head as shown by broken lines in Figs. 1 and 3; two sides of said seats being formed in the main steel-casting of the head, a third side by the plates $p$, and a fourth by the wedge-gibs H, which are adjusted by the screws $c$, the gibs being bifurcated and dentated to correspond with the screws $c$. These gibs being open at their sides as shown in Figs. 4 and 5 obviously allow a desirable and necessary lateral movement of the screws $c$, to accommodate the gibs H in their slight lateral movement when thrust forward or withdrawn, such movement being due to their wedge shape. These wedge-gibs, being withdrawn or thrust forward by the revolution of the screws c, operate to perfectly adjust the surfaces upon which the jaws slide or to correct the result of any subsequent wear of them, which would allow a lateral motion of the jaws were there no means of lateral adjustment whereby they could be held firmly in position.

The revolution of the right-and-left screw G, which may be turned from either end, operates the jaws E simultaneously, the threaded portion of said screw being turned in contact with the concave threaded sides of the jaws E, thus centering the work on the face-plate. This right-and-left screw G cannot, obviously, be fastened in the common manner in this chuck to prevent it from slipping endwise, namely, by parting the chuck-head at the axis of the screw, which fact gave rise to the conception of the manner of such fastening which is shown in Figs. 1, 3, and 6 of the drawings, viz., by providing the screw G with a collar n having a proper seat, as shown in Fig. 6, that is, with a hole considerably enlarged over the one in which the body of the screw G fits through the head. The hole is also counterbored for the plate or washer s, which, when placed in the enlarged opening, over the collar n, and firmly screwed in place as shown in the two figures last cited, prevents any possible endwise movement of the screw G when the jaws E are being operated therewith.

This chuck is especially adapted to the boring for the axle and the counterboring of the two ends of bicycle-hubs and analogous work. To permit work to be put into the jaws when, as is the case in bicycle-hubs, the ends are larger than the center, and which ends will not pass through between the jaws of the chuck, the chuck-head has an opening at one side of the jaws, as shown in Fig. 1, and the opening through the arm is large enough to allow the desired work to be passed through, said arm strengthening the chuck-head on the side that is so cut away as to form a passage into the opening between the jaws.

As the screw G necessarily passes the opening between the chuck-jaws, the opening in the head B is on the side of the jaws opposite said screw, and necessarily, the arm b, being on the same side, would make it difficult to apply ordinary gib-screws to the gibs H. Hence the wedge form of the gibs, and the position of the adjusting screws c.

Having thus described my invention, I claim as new and desire to secure by Letters Patent of the United States—

1. In a reversible chuck, a base-plate carrying bearings and adapted to be secured to a lathe-spindle, a chuck-head journaled in said bearings so as to be rotatable therein, and an arm rigidly secured to said rotatable head adapted to rest on the said base-plate and means substantially as described for securing it in contact therewith.

2. In a reversible chuck, a base-plate adapted to be secured to the spindle of a lathe and carrying lugs set substantially quartering on its face, two opposite lugs carrying bearing-boxes on their ends, a double-faced chuck mounted pivotally on trunnions in said bearing-boxes, an arm extending from said chuck so that one of its sides will contact with the top of one of the two other lugs when the chuck is in operative position and means for securing said arm in contact therewith.

3. In a reversible chuck, a base-plate adapted to be secured to the spindle of a lathe and carrying lugs set substantially quartering on its face, two opposite lugs carrying bearing-boxes on their ends, a double-faced chuck mounted pivotally on trunnions in said bearing-boxes, an arm extending from said chuck so that one of its sides will contact with the top of one of the two other lugs when the chuck is in operative position and means for securing said arm in contact therewith, consisting of a bolt secured pivotally to said arm and adapted to engage and be tightened upon the base-plate.

4. In a reversible chuck, a base-plate adapted to be secured to the spindle of a lathe and carrying lugs set substantially quartering on its face, two opposite lugs carrying bearing-boxes on their ends, a double-faced chuck mounted pivotally on trunnions in said bearing-boxes, an arm extending from said chuck so that one of its sides will contact with the top of one of the two other lugs when the chuck is in operative position and means for securing said arm in contact therewith, consisting of a bolt secured pivotally to said arm and adapted to engage and be tightened upon the base-plate, said bolt being inclined inwardly when fastened, for the purpose specified.

5. In a chuck, a chuck-head and jaws movably set therein, said chuck-head being cut away at one side of the jaws so as to permit the insertion of a piece of work between said jaws sidewise thereof, and reinforced by an arm spanning said opening and leaving an aperture large enough to allow the work to be passed through.

6. In a chuck, a chuck-head provided with guides, jaws adapted to slide therein and means for holding said jaws in any set position, gibs interposed between said jaws and inclined seats in the guides said gibs being wedges bifurcated on one end, the inner sides of the arms formed by the bifurcation being dentated and screws set in said chuck-head their ends entering said bifurcation and being screw-threaded to fit the dentations therein.

In testimony whereof I hereunto affix my signature in the presence of two witnesses.

OLUF TYBERG.

Witnesses:
WM. KIEL, Jr.,
EDWARD F. BATES.